Figure 1:
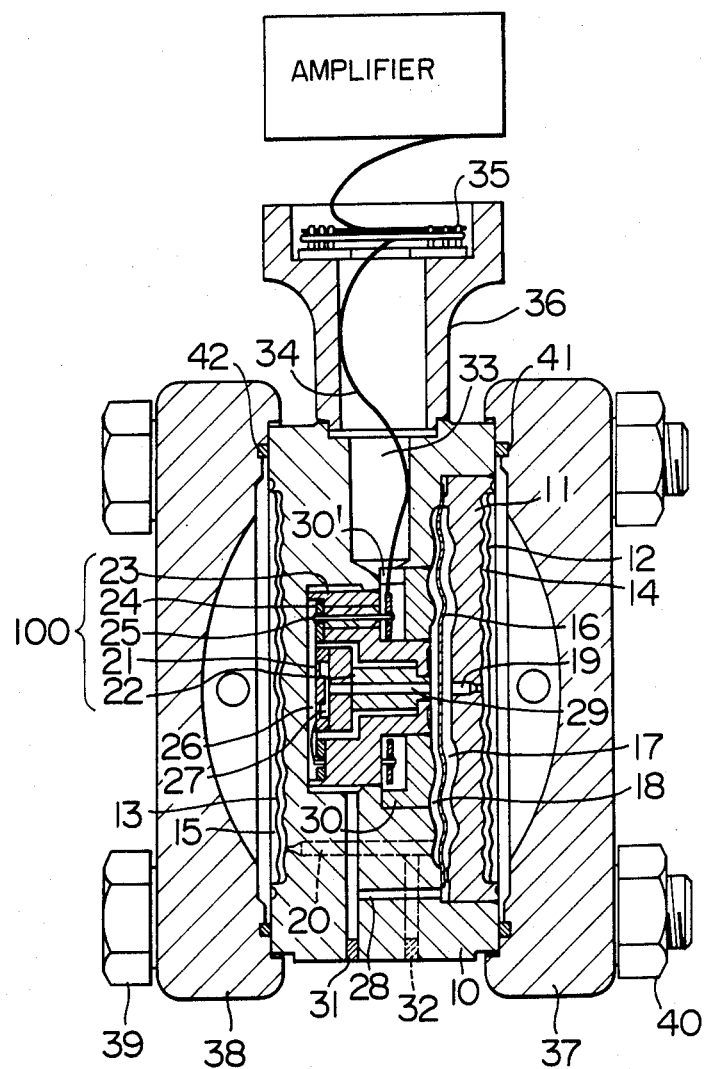

United States Patent [19]

Tobita et al.

[11] Patent Number: 4,546,653
[45] Date of Patent: Oct. 15, 1985

[54] SEMICONDUCTOR DIFFERENTIAL PRESSURE TRANSDUCER

[75] Inventors: Tomoyuki Tobita, Katsuta; Yoshimi Yamamoto; Akira Nagasu, both of Ibaraki; Yukio Takahashi, Katsuta, all of Japan

[73] Assignee: Hitachi, Ltd., Tokyo, Japan

[21] Appl. No.: 606,993

[22] Filed: May 3, 1984

[30] Foreign Application Priority Data

May 4, 1983 [JP] Japan .................................. 58-78601

[51] Int. Cl.$^4$ ........................... G01L 7/08; G01L 9/00
[52] U.S. Cl. ....................................... 73/720; 73/706; 73/721
[58] Field of Search ................. 73/721, 720, 706, 708, 73/716, 717, 718, 719, 722

[56] References Cited

U.S. PATENT DOCUMENTS

| | | | |
|---|---|---|---|
| 4,028,945 | 6/1977 | Bergamini | 73/706 |
| 4,135,408 | 1/1979 | DiGiovanni | 73/721 |
| 4,342,231 | 8/1982 | Yamamoto et al. | 73/721 |
| 4,364,276 | 12/1982 | Shimazoe et al. | 73/721 |

Primary Examiner—Donald O. Woodiel
Attorney, Agent, or Firm—Antonelli, Terry & Wands

[57] ABSTRACT

A semiconductor differential pressure transducer comprises a pair of pressure receiving chambers at both sides of a pressure receiving part, and a pair of compensating chambers and a pair of pressure measuring chambers which are placed in the pressure receiving part, and the pressure receiving chambers communicate with the pressure measuring chambers through the compensating chambers.

7 Claims, 3 Drawing Figures

SEMICONDUCTOR DIFFERENTIAL PRESSURE TRANSDUCER

This invention relates to a semiconductor differential pressure transducer which is so constructed as to detect a differential pressure between two fluids in such a form as converted into an electrical signal by a semiconductor differential sensor, and as to protect the semiconductor differential pressure sensor from excessive pressure or shocking pressure.

Such a kind of differential pressure transducer is disclosed in U.S. Pat. Nos. 4,135,408; 4,342,231 and 4,364,276, for example. Especially, U.S. Pat. No. 4,135,408, discloses a semiconductor differential sensor which is protected from overload by the cooperation of one compensating diaphragm and two pressure receiving diaphragms.

Although such a differential pressure transducer provides desired effects in many applications, it still possesses some disadvantages. Namely, a measuring chamber for the semiconductor differential pressure sensor is directly connected with a pressure receiving chamber consisting of a pressure receiving diaphragm and a housing without placing a compensating chamber having a compensating diaphragm, therebetween and therefore when shocking pressure is applied to the pressure receiving diaphragm, this shocking pressure directly affects the measuring chamber, which may lead to some damage to the semiconductor differential sensor or malfunction thereof. Further, since the semiconductor differential sensor is attached to the compensating diaphragm which is a movable body, the above differential transducer is also susceptible to the affect of vibration.

An object of this invention is to provide a semiconductor differential transducer which is so constructed as not to permit a semiconductor pressure sensor to be damaged or malfunction due to shocking pressure.

The semiconductor differential pressure transducer according to this invention is equipped with:

(a) two pressure receiving diaphragms making contact with pressure fluids and two pressure receiving chambers (high pressure side pressure receiving chamber and low pressure chamber) each being formed by a corresponding one of the pressure receiving diaphragms and a pressure receiving member of a pressure receiving part;

(b) a compensating chamber connected with these pressure receiving chambers and including a high pressure side compensating chamber and a low pressure side compensating chamber separated by a compensating diaphragm placed at the center of the compensating chamber, these compensating chambers and pressure receiving chambers being connected by first pressure leading paths placed in the pressure receiving part, and having a volume such as to absorb the entire fluid excluded from the pressure receiving chambers without contacting the compensating diaphragm with the side surfaces of the compensating chambers even when excessive pressure is applied, and the compensating diaphragm having a rigidity adapted to the volumes of the pressure receiving chambers;

(c) a measuring chamber connected with the compensating chamber, which consists of a high pressure side measuring chamber and a low pressure side measuring chamber separated by a semiconductor sensor producing a signal corresponding to a difference in pressure between the pressure receiving diaphragms, and these measuring chambers and the compensating chambers are connected with each other by second pressure loading paths placed in the pressure receiving member.

Accordingly, the semiconductor differential pressure transducer provides a construction in which a semiconductor differential pressure sensor is not susceptible, or resistant to shocking pressure since, where shocking pressure is applied to the pressure receiving diaphragm, it necessarily affects the measuring chambers through the compensating chambers.

Figure 2:
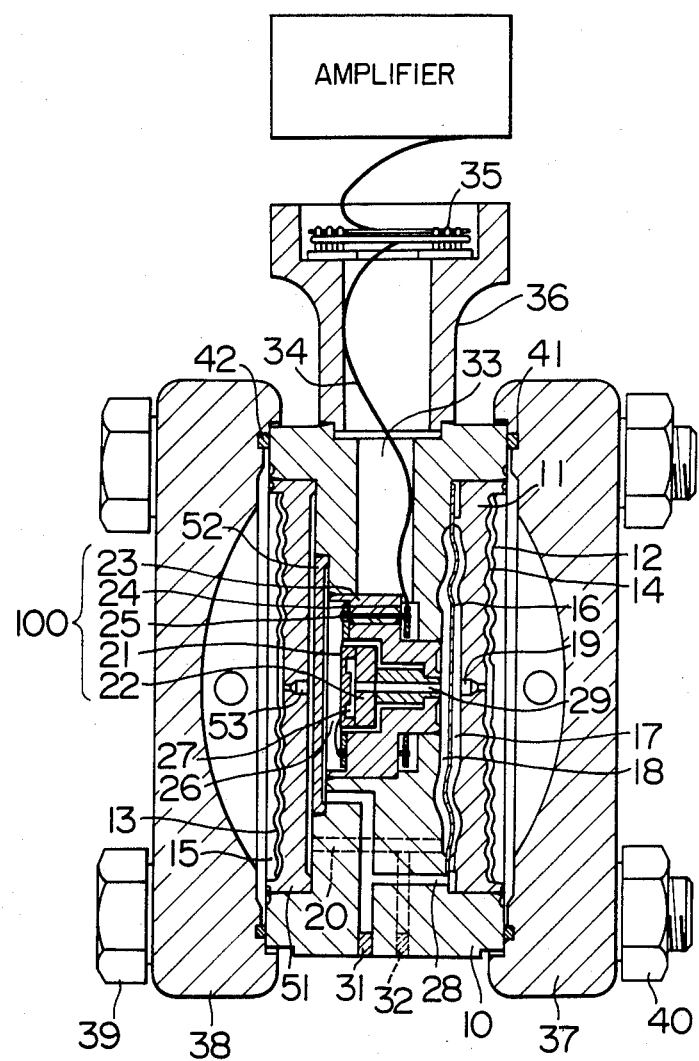
Figure 3:
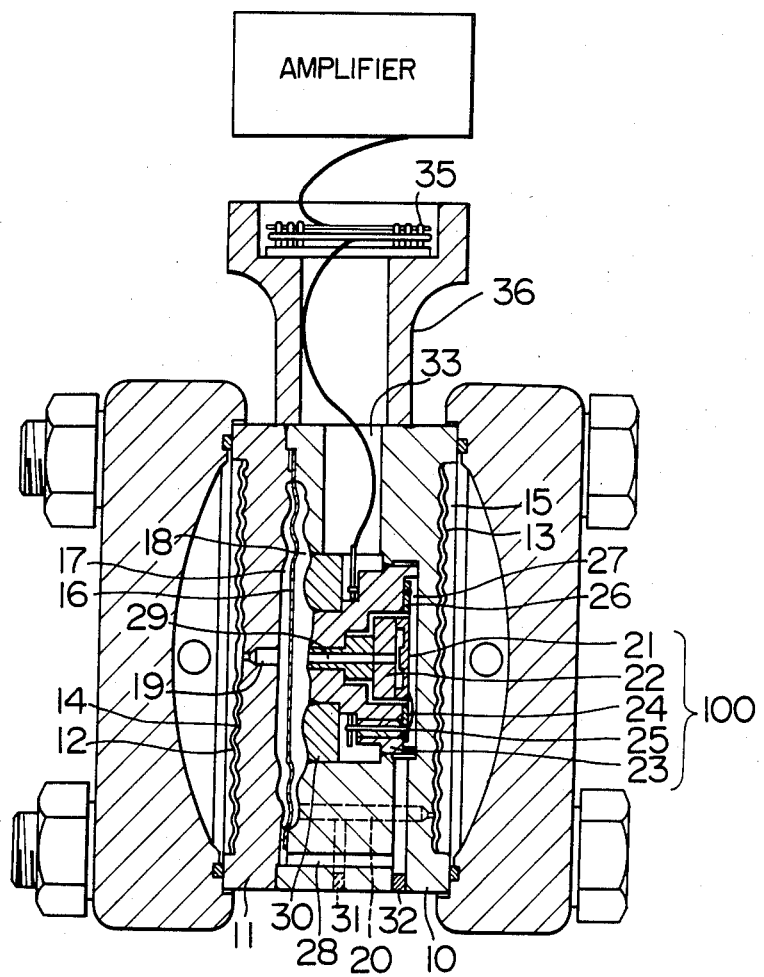

The present invention will be apparent from the following detailed description taken in conjunction with the accompanying drawings, in which:

FIG. 1 is a sectional view of one embodiment of the semiconductor differential pressure transducer according to this invention, and FIGS. 2 and 3 are sectional views of the other embodiments of this invention, respectively.

Referring to FIG. 1, a pressure receiving part is comprised of a first member 10 and a second member 11. A flexible high pressure side pressure receiving diaphragm 12 and a flexible low pressure side pressure receiving diaphragm 13 are mounted to the opposite outsides of the first member 10 and the second member 11 of the pressure receiving part, respectively. On the surfaces of the pressure receiving members opposite to these diaphragms 12 and 13 are formed wave-like surfaces having the same shapes as the pressure receiving diaphragms, respectively, and two pressure receiving chambers, i.e., a high pressure side pressure receiving chamber 14 and a low pressure side pressure receiving chamber 15 are formed each between the associated pressure receiving members and the corresponding pressure receiving diaphragm by welding the peripheries of the pressure receiving diaphragm 12 or 13 to the pressure receiving member 10 or 11. A compensating diaphragm 16 is welded to the high pressure receiving side of the first pressure receiving member 10, and the second pressure receiving member 11, is welded to one side of the compensating diaphragm 16 so as to be engaged with the first pressure receiving member 10. Thus, a high pressure side compensating chamber 17 is formed between the second member 11 and the compensating diaphragm 16. This high pressure side compensating chamber 17 and the above high pressure side pressure receiving chamber 14 are made to communicate with each other through a first high pressure side pressure leading path 19 formed in the second member 11. On the other hand, at the other side of the compensating diaphragm 16 is formed a concave portion for inserting a semiconductor differential pressure sensor assembly 100 in the first pressure receiving member 10. A semiconductor differential pressure sensor 21 is welded to a metallic sealing fitting 23 through a support 22 in the concave portion. To the sealing fitting 23 are attached a ceramic substrate 24 and a hermetic sealing pin 25 to derive an electric signal from the semiconductor differential pressure sensor 21. The connection between the semiconductor differential pressure sensor 21 and the ceramic substrate 24 is made by wire-bonding, or the like. Thus, a high pressure side measuring chamber 26 is formed between the above concave portion of the first pressure receiving member 10 and one side of the semiconductor differential pressure sensor 21. This high pressure side measuring chamber 26 is made to communicate with the high pressure compensating chamber 17 formed by the compensating diaphragm 16 and the second pressure receiving member 11 through a second high pressure side pressure leading path 28 placed within the first pressure receiving member 10. On the other hand, at the other side of the semiconductor differential pressure sensor 21, a low pressure side measuring chamber 27 is formed between a diaphragm concave portion of the semiconductor differential pressure sensor 21 and the support 22 and this low pressure side measuring chamber 27 is made to communicate with one side of the compensating diaphragm 16 through an opening penetrating through the support 22, i.e., a second low pressure side pressure leading path 29. Further, between the compensating diaphragm 16 and the first pressure receiving member 10, the external periphery of a plate 30 is welded to the internal periphery of the first pressure receiving member 10 while the internal periphery thereof is welded to the external periphery of the sealing fitting 23. Thus, a low pressure side compensating chamber 18 is formed between the compensating diaphragm 16, and the first pressure receiving member 10 and the plate 30. This low pressure compensating chamber 18 is made to communicate with the low pressure side measuring chamber 27 of the semiconductor differential pressure sensor 21 through the second low pressure side pressure leading path 29. The low pressure side pressure receiving chamber 15 and the low pressure side compensating chamber 18 are made to communicate with each other through a first low pressure side pressure leading path 20 formed in the first pressure receiving member 10. Incidentally, the second high pressure side pressure leading path 28 and the first low pressure side pressure leading path 20 are formed so that they don't cross each other in the first pressure receiving member 10.

As described above, the electric signal from the semiconductor differential pressure sensor 21 is derived through the hermetic sealing pin 25, and is easily taken out to the exterior by a connecting printed circuit 35 or the like through a signal line 34 placed in a lead path 33 and a notch 30' of the plate 30 which are provided in the direction of perpendicular to the center line of the semiconductor differential sensor 21. The sealing between the lead path 33, and the high pressure side measuring chamber 26 and the low pressure side compensating chamber 18, as described above, is completely made by the welding between the first pressure receiving member 10 and the sealing fitting 23 and by the welding among the first pressure receiving member 10, the sealing fitting 23 and the plate 30. All of the chambers and the paths formed in such a construction are filled with incompressible fluid such as silicone oil. This oil is injected from a lead path which branches into the first low pressure side pressure leading path 20 and the second high pressure side pressure leading path 28, and the opening of which is exposed to the surface of the first pressure receiving member 10, and is blocked by sealing pins 31 and 32 and sealed from the air through the welding thereof.

When shocking pressure is applied to either one of the pressure receiving diaphragms 12 and 13 in the differential pressure transducer thus constructed, at first the shocking pressure propagates to the pressure receiving chamber, to the compensating chamber therefrom, and to the measuring chamber therefrom through the pressure leading path. Namely, the shocking pressure is always propagated to the measuring chamber through the compensating chamber formed by the compensating diaphragm, and therefore the malfunction of the semiconductor sensor or the other affection thereto which is attributable to shocking pressure can be sufficiently obviated.

Next, when excessive load pressure occurs, either one of the high pressure side pressure receiving diaphragm 12 and the low pressure side pressure receiving diaphragm 13 is seated on the side surface of the pressure receiving member. On the other hand, the compensating diaphragm has a predetermined rigidity so that it may not still be seated on the side surface of the compensating chamber even if it absorbs the removal of the volume of the pressure receiving chamber. Therefore, the propagation of the excessive fluid pressure to either one surface of the semiconductor differential pressure sensor through the filled oil is prevented, which doesn't lead to the breakdown of the semiconductor differential pressure sensor.

In accordance with the embodiment of this invention, since shocking pressure is not directly applied to the semiconductor differential pressure sensor, the malfunction thereof or the damage thereto can be prevented. And since any organic material doesn't exist in the space filled with the fluid, the semiconductor differential pressure sensor is not influenced by the meltdown of the organic material which may occur at a high ambient temperature, etc.

FIG. 2 is a sectional view of the other embodiment of the semiconductor differential pressure transducer according to this invention. In this figure, like reference numerals refer to like elements in FIG. 1. The construction of FIG. 2 is different from that of FIG. 1 in the first member 10 of the pressure receiving part to which the diaphragm 13 is attached. Namely, this first member 10 is equipped with a third member 51 for supporting the diaphragm 13 which is fixed to the first member 10 through the engagement with or welding to the latter. At the other surface of the third member 51 opposite to the one surface thereof where the diaphragm is formed, is provided a plate 52 with a slight gap to the other surface, which is fixed to the first member 10. Further, at the rear of this plate 52, there is arranged the semiconductor differential pressure sensor assembly shown in FIG. 1 which is accompanied by the high pressure side measuring chamber 26. Incidentally, at the center of the third member 51 is formed a low pressure side pressure leading path 53 which is made to communicate with the first low pressure side pressure leading path 20 through the gap between the third member 51 and the plate 52.

The construction of FIG. 2 is such as the second member 11 and the third member 51 having the same shape as the second member 11 are symmetrically engaged with the first member 10, which correspondingly produces an elastic deformation due to static pressure thereby to reduce the error due to the static pressure. This construction can be assembled from both sides because of the symmetry thereof, and so provides a high working efficiency.

FIG. 3 shows a sectional view of a further embodiment according to this invention. In this embodiment, as seen from the figure, the first member 10 and the second member 11 constituting the pressure receiving part are connected to each other at respective junction surfaces thereof, which are made flat and parallel to each other, while sandwiching the compensating diaphragm 16 therebetween. Therefore, when the first member 10 and the second member 11 are assembled and subsequently welded to each other, the portions as welded will be exposed to outsides of the assembly. Thus, some distortion which is attributed to the welding of these portions occurs in such a direction as the first member 10 and the second member 11 pull each other, which serves to intensify the degree of the nipping of the compensating diaphragm 16. Accordingly, although the compensating diaphragm 16 is welded at the side of the first member 10, the compressive force due to the above effect will provide a high reliability to the fixing of the compensating diaphragm 16.

As described above, in accordance with this invention, there is provided a semiconductor differential pressure transducer eqquiped with the means for very efficiently obviating shocking pressure.

We claim:

1. A semiconductor differential pressure transducer comprising:

a pressure receiving part, a pair of pressure receiving diaphragms forming first and second pressure receiving chambers at both sides of the pressure receiving part;

a compensating diaphragm forming first and second compensating chambers in said pressure receiving part;

a semiconductor differential pressure sensor forming first and second pressure measuring chambers in said pressure receiving part;

first and second pressure leading paths for enabling communication of said first pressure receiving chamber with said first compensating chamber and for enabling communication of said second pressure receiving chamber with said second compensating chamber, respectively, and third and fourth pressure leading paths for enabling communication of said first compensating chamber with said first pressure measuring chamber and for enabling communication of said second compensating chamber with said second pressure measuring chamber, respectively;

said first pressure receiving chamber and said first pressure measuring chamber; and said second pressure receiving chamber and said second pressure measuring chamber communicating with each other through said first and second compensating chamber, respectively; said first compensating chamber and said first pressure measuring chamber being formed between said second compensating chamber and said second pressure measuring chamber.

2. A semiconductor differential pressure transducer according to claim 1, wherein said pressure receiving part is composed of a first member and a second member engaged with the first member.

3. A semiconductor differential pressure transducer according to claim 2, wherein said compensating diaphragm is installed between said first member and said second member.

4. A semiconductor differential pressure transducer according to claim 2, wherein said pressure receiving part is composed of said first member, and said second member and a third member which are engaged with the first member from both sides thereof and said first and second pressure receiving diaphragms are attached to said second and third members, respectively.

5. A semiconductor differential pressure transducer according to claim 2, wherein said pressure receiving part is composed of said first and second members the junction surfaces between which is substantially flat.

6. A semiconductor differential pressure transducer according to claim 5, wherein said compensating diaphragm is provided between said first and second member so that it is substantially coplanar to said junction surfaces.

7. A semiconductor differential pressure transducer according to claim 1, wherein said semiconductor differential pressure sensor is attached to said pressure receiving part through a hollow support.

* * * * *